(12) United States Patent
Vizzini et al.

(10) Patent No.: US 11,827,119 B2
(45) Date of Patent: Nov. 28, 2023

(54) TEMPERATURE MANAGEMENT SYSTEM FOR AN ENERGY SYSTEM OF A MOTOR VEHICLE

(71) Applicant: Volvo Car Corporation, Gothenburg (SE)

(72) Inventors: Simone Vizzini, Gothenburg (SE); Leonardo Amato, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 488 days.

(21) Appl. No.: 17/156,784

(22) Filed: Jan. 25, 2021

(65) Prior Publication Data

US 2021/0245626 A1 Aug. 12, 2021

(30) Foreign Application Priority Data

Feb. 7, 2020 (EP) .................................... 20156029

(51) Int. Cl.
  *B60L 58/25* (2019.01)
  *B60L 58/26* (2019.01)

(52) U.S. Cl.
  CPC ............. *B60L 58/25* (2019.02); *B60L 58/26* (2019.02); *B60L 2240/545* (2013.01)

(58) Field of Classification Search
  CPC ..... B60L 58/25; B60L 58/26; B60L 2240/545
  See application file for complete search history.

(56) References Cited

U.S. PATENT DOCUMENTS 10,910,680 B2 * 2/2021 Fleming ................ H01M 10/46
11,247,583 B2 * 2/2022 Bellino ............... H01M 10/613
2013/0108897 A1 * 5/2013 Christian ............ H01M 10/647
  429/50
2014/0165597 A1   6/2014 Hernon et al.
2018/0287231 A1 * 10/2018 Iyengar ................. H01M 50/24
2020/0343601 A1 * 10/2020 Carlson ................... B60L 58/26

OTHER PUBLICATIONS

Jun. 30, 2020 European Search Report issued on International Application No. 20156029.
Foley et al., Voltage-Controlled Bistable Thermal Conductivity in Suspended Ferroelectric Thin-Film Membranes, ACS Applied Materials & Interfaces, vol. 10, No. 30, Jul. 6, 2018.

* cited by examiner

*Primary Examiner* — Gertrude Arthur Jeanglaude
(74) *Attorney, Agent, or Firm* — Clements Bernard Walker; Christopher L. Bernard

(57) ABSTRACT

The disclosure relates to a temperature management system for an energy system of a motor vehicle. The temperature management system includes an energy storage system, a conductivity element, and an ambient interface. The ambient interface includes a first surface directed to an environment of the energy system and a second surface opposite to the first surface. The conductivity element is arranged between the second surface of the ambient interface and the energy storage system. The conductivity element is switchable between an isolating mode with a first lower thermal conductivity and a conductive mode with a second higher thermal conductivity. The conductivity element includes a voltage sensitive material. The voltage sensitive material is switchable between the first and the second thermal conductivity depending on an applied voltage. The voltage sensitive material includes a piezoelectric material.

20 Claims, 2 Drawing Sheets

TEMPERATURE MANAGEMENT SYSTEM FOR AN ENERGY SYSTEM OF A MOTOR VEHICLE

CROSS-REFERENCE TO RELATED APPLICATION

The present disclosure claims the benefit of priority of co-pending European Patent Application No. 20 156 029.9, filed on Feb. 7, 2020, and entitled "TEMPERATURE MANAGEMENT SYSTEM FOR AN ENERGY SYSTEM OF A MOTOR VEHICLE," the contents of which are incorporated in full by reference herein.

TECHNICAL FIELD

The disclosure relates to a temperature management system for an energy system of a motor vehicle, a motor vehicle including such temperature management system and a temperature management method for an energy system of a motor vehicle.

BACKGROUND

Motor vehicles and in particular electric motor vehicles and hybrids are provided with large and expensive batteries. The lifespan and power of theses batteries are immanent for the driving range and value of the electric motor vehicle or hybrid.

Batteries are however sensitive to temperature changes and operate best in rather small ranges of temperatures. In contrast, motor vehicles are used in a wide range of temperatures between e.g. minus 30 and plus 60 degree Celsius. A battery close to a conventional engine might even be subjected to higher temperatures due to the high waste heats from the conventional engine.

As a result, the temperature changes and extrema that occur to a battery used in a motor vehicle decrease the lifespan and power of the battery. In particular, the power of the battery is essential for the driving range of the motor vehicle and should not be decreased.

There are temperature management systems for batteries or energy systems, but they need to be further improved. For example, DE103 19 350 B4 discloses a battery box with a robust case and cover, which has a double-walled construction for vacuum insulation.

SUMMARY

Hence, there may be a need to provide an improved temperature management system for an energy system of a motor vehicle, which provides a better protection of the energy system from temperature changes.

The problem is solved by the subject-matters of the disclosure. It should be noted that the aspects of the disclosure described in the following apply to the temperature management system for an energy system of a motor vehicle, a motor vehicle including such temperature management system and a temperature management method for an energy system of a motor vehicle.

According to the present disclosure, a temperature management system for an energy system of a motor vehicle is presented. The temperature management system includes an energy storage system, a conductivity element, and an ambient interface.

The ambient interface includes a first surface directed to an environment of the energy system and a second surface opposite to the first surface.

The conductivity element is arranged between the second surface of the ambient interface and the energy storage system. The conductivity element is switchable between an isolating mode and a conductive mode.

The conductivity element provides in the isolating mode a first thermal conductivity. The conductivity element provides in the conductive mode a second thermal conductivity. The first thermal conductivity is lower than the second thermal conductivity.

The conductivity element includes a voltage sensitive material. The voltage sensitive material is switchable between the first and the second thermal conductivity depending on an applied voltage. The voltage sensitive material includes a piezoelectric material.

The temperature management system according to the present disclosure can be understood to protect the energy storage system (e.g. a battery) from temperature changes and temperature extrema. The temperature management system may keep the energy storage system in a temperature range, which is optimal for an operation of the energy storage system and/or the motor vehicle. As a result, the temperature management system according to the present disclosure can be understood to increase a capacity and/or a lifespan of the energy storage system. By protecting the energy storage system, an increased energy efficiency, decreased thermal losses and/or a higher range of the motor vehicle can be achieved. Further, the weight and/or volume of the energy system and therefore of the motor vehicle is not increased.

The energy storage system can be understood as a system configured for storing energy. It can be a battery, a rechargeable battery, a module including several batteries or the like. The energy storage system can be used for powering and driving the motor vehicle and/or as an auxiliary unit to provide energy for accessories.

The ambient interface can be understood as an element or layer facing on one side the ambient or environment of the energy system and is directed on the other side towards the energy storage system (e.g. a battery). The ambient interface can be understood as an element configured to support or hold the energy storage system. It can be a battery tray or the like.

The conductivity element can be understood as an element or layer arranged between the energy storage system (e.g. a battery) and the ambient interface (e.g. a battery tray). The conductivity element can have different states or modes. The conductivity element includes a piezoelectric material, which is a voltage sensitive material. This can be understood in that a thermal conductivity of the conductivity element can be changed depending on a voltage applied to the conductivity element. As a result, the conductivity element is switchable between a first thermal conductivity and a second thermal conductivity. The first thermal conductivity is different to and lower than the second thermal conductivity. The first thermal conductivity puts the conductivity element in the isolating mode and the second, higher thermal conductivity puts the conductivity element in the conductive mode. The thermal conductivity of the conductivity element is higher in the conductive mode than in the isolating mode.

The temperature management system can be understood to protect the energy storage system from temperature changes. The temperature changes can arise through at least one of a group including modes of the motor vehicle and environment conditions. In other words, the temperature management system may balance at least one of the following situations:

When driving the motor vehicle, the conductivity element can be used to reduce or eliminate an unwanted temperature increase of the energy storage system by e.g. too much or too hot waste heat of the engine of the motor vehicle or other consuming units of the motor vehicle. The conductivity element can then be switched into the conductive mode with the second thermal conductivity to provide a heat transfer to and a heat exchange with the environment, which is usually cooler than the engine. In an embodiment, the conductivity element is therefore switchable to the conductive mode when the motor vehicle is in the driving mode. As a result, the heating of the energy storage system is reduced when the motor vehicle is driving. Consequently, energy efficiency of the energy storage system can be increased and a higher range of the motor vehicle can be achieved.

When parking the motor vehicle, the conductivity element can be used to reduce or eliminate an unwanted temperature loss of the energy storage system due to e.g. missing waste heat of the engine or other consuming units. The conductivity element can then be switched into the isolating mode with the first thermal conductivity to reduce or eliminate a heat transfer to and a heat exchange with the environment, which is usually cooler than a good operational temperature of the energy storage system, which might be around 30 degree Celsius. In an embodiment, the conductivity element is therefore switchable to the isolating mode when the motor vehicle is in a parking mode. As a result, the energy storage system is kept warm relative to the ambient surrounding of about e.g. 20 degree Celsius while the motor vehicle is not driving, but parking. Consequently, energy efficiency of the energy storage system can be increased and a higher range of the motor vehicle can be achieved.

In cold environments, the conductivity element can be used to reduce or eliminate an unwanted temperature loss of the energy storage system due to the cold environment and the therefore cold ambient interface (e.g. battery tray). A "cold environment" can be understood as below 0 degree Celsius, preferably below minus 10 degree Celsius and less, more preferably below minus 15 degree Celsius and less. The conductivity element can then be switched into the isolating mode with the first thermal conductivity to reduce or eliminate a heat transfer to and a heat exchange with the environment, which is now definitely cooler than an operational temperature of the energy storage system. In an embodiment, the conductivity element is therefore switchable to the isolating mode when the motor vehicle is in a cold environment. As a result, the energy storage system is isolated from the ambient interface to avoid a thermal bridge to the surrounding environment. The energy storage system is kept warm relative to the cold surrounding environment. Consequently, energy efficiency of the energy storage system can be increased and a higher range of the motor vehicle can be achieved.

In very hot environments, the conductivity element can be used to reduce or eliminate an unwanted temperature increase of the energy storage system due to the very hot environment and the therefore very hot ambient interface (e.g. battery tray). A "very hot environment" can occur in very hot environments and/or while parking the motor vehicle in the sun. A "very hot environment" can be understood as above 40 degree Celsius, preferably above 50 degree Celsius, more preferably above 60 degree Celsius. The conductivity element can then be switched into the isolating mode with the first thermal conductivity to reduce or eliminate a heat transfer from and a heat exchange with the environment, which is now hotter than a good operational temperature of the energy storage system, which might be around 30 degree Celsius. In an embodiment, the conductivity element is therefore switchable to the isolating mode when the motor vehicle is in a very hot environment. As a result, the energy storage system is isolated from the ambient interface to avoid a thermal bridge to the surrounding environment. The energy storage system is kept cool relative to the very hot surrounding environment. Consequently, energy efficiency of the energy storage system can be increased and a higher range of the motor vehicle can be achieved.

Of course, the temperature management system may also balance combinations of the above listed situations, e.g. parking in cold or very hot environments.

In an embodiment, the temperature management system includes a control unit configured to detect when the motor vehicle is in the parking mode or the driving mode. The control unit can be further configured to switch the conductivity element correspondingly into the isolating mode or the conductive mode. The control unit may be a processor. The detection of the parking mode or the driving mode may be based on monitoring the engine of the motor vehicle, the tires, the ignition, the ignition key, position data, acceleration data and/or the like.

In an embodiment, the temperature management system includes a temperature unit configured to detect an outside temperature outside the motor vehicle. The temperature unit is further configured to switch the conductivity element based on the outside temperature into the isolating mode or the conductive mode. Also the control unit may be configured to receive outside temperature data from the temperature unit and to switch the conductivity element based on the outside temperature into the isolating mode or the conductive mode.

In an embodiment, the temperature unit is configured to detect an inside temperature of the energy storage system. The temperature unit is then further configured to switch the conductivity element based on the inside temperature into the isolating mode or the conductive mode. The control unit may be also configured to receive inside temperature data from the temperature unit and to switch the conductivity element based on the inside temperature into the isolating mode or the conductive mode.

In an embodiment, the piezoelectric material is a ceramic perovskite material. In an embodiment, the piezoelectric material is lead zirconate titanate.

In an embodiment, the conductivity element is a two-states element. The term "two-states element" can be understood in that the two-states element has only either the first or the second thermal conductivity. There is no other state, thermal conductivity or possibility.

In an embodiment, the temperature management system does not need and does not include any additional cooling system, as e.g. a passive or active cooling plate. Thereby, even more energy is saved.

In another embodiment, the temperature management system further includes a cooling system. The cooling system is arranged between the energy storage system and the conductivity element. The cooling system may cool the energy storage system (e.g. battery) to avoid a temperature increase above an optimal operational temperature. In an embodiment, the cooling system is a passive cooling system. The passive cooling system has a good energy efficiency. In another embodiment, the cooling system is an active cooling system. The active cooling system has more power.

In an embodiment, the temperature management system further includes a thermal interface. The thermal interface is an element or layer arranged between the energy storage system and the cooling system.

In an embodiment, the temperature management system does not need and does not include any additional heating system, as e.g. a passive or active heating plate. Thereby, even more energy is saved.

In another embodiment, the temperature management system further includes a heating system. The heating system is arranged between the energy storage system and the conductivity element. The heating system may heat the energy storage system to avoid a temperature decrease below an optimal operational temperature.

In an embodiment, the conductivity element includes a cavity that can be filled with conductive material for the conductive mode and that remains unfilled with the conductive material for the isolating mode. The conductive material is preferably solid (e.g. as pellets, balls or the like) and not liquid.

In another embodiment, the conductivity element includes a cavity that can be filled with isolating material for the isolating mode and that remains unfilled with the isolating material for the conductive mode. The isolating material is preferably solid (e.g. as pellets, balls or the like) and not liquid.

According to the present disclosure, also a motor vehicle including a temperature management system as described above is presented. The motor vehicle includes the temperature management system as described above. The temperature management system is configured or able to control a temperature of an energy storage system of the motor vehicle.

The motor vehicle may be an electric motor vehicle, a hybrid motor vehicle or a conventional motor vehicle.

According to the present disclosure, also a temperature management method for an energy system of a motor vehicle is presented. The temperature management method includes the following steps:

Providing a temperature management system for an energy system of a motor vehicle, wherein the temperature management system includes an energy storage system, a conductivity element, and an ambient interface. The ambient interface includes a first surface directed to an environment of the energy system and a second surface opposite to the first surface. The conductivity element is arranged between the second surface of the ambient interface and the energy storage system.

Applying a voltage to the conductivity element. The conductivity element includes a voltage sensitive material. The voltage sensitive material includes a piezoelectric material, so that the conductivity element switches between an isolating mode and a conductive mode. The conductivity element provides in the isolating mode a first thermal conductivity and in the conductive mode a second thermal conductivity, wherein the first thermal conductivity is lower than the second thermal conductivity.

The temperature management method according to the present disclosure can be understood to protect the energy storage system (e.g. a battery) from temperature changes. The temperature management method may keep the energy storage system in a temperature range, which is optimal for an operation of the energy storage system and/or the motor vehicle. As a result, the temperature management method according to the present disclosure can be understood to increase a capacity and/or a lifespan of the energy storage system. By protecting the energy storage system, an increased energy efficiency, decreased thermal losses and/or a higher range of the motor vehicle can be achieved.

In an embodiment, the temperature management method further includes the step of:
detecting if the motor vehicle is in a parking mode, and if yes, applying the voltage to switch the conductivity element in the isolating mode.

In the isolating mode, the conductivity element may then keep the energy storage system warm relative to the ambient surrounding. As a result, the energy storage system is kept warm relative to the ambient surrounding of about e.g. 20 degree Celsius while the motor vehicle is not driving, but parking. Consequently, energy efficiency of the energy storage system can be increased and a higher range of the motor vehicle can be achieved.

In an embodiment, the temperature management method further includes the step of:
detecting if the motor vehicle is in a driving mode, and if yes, applying the voltage to switch the conductivity element in the conductive mode.

In the conductive mode, the conductivity element may reduce a heating of the energy storage system. As a result, the heating of the energy storage system is reduced when the motor vehicle is driving. Consequently, energy efficiency of the energy storage system can be increased and a higher range of the motor vehicle can be achieved.

It shall be understood that the system, the motor vehicle, and the method according to the independent claims have similar and/or identical preferred embodiments, in particular, as defined in the dependent claims. It shall be understood further that a preferred embodiment of the disclosure can also be any combination of the dependent claims with the respective independent claim.

These and other aspects of the present disclosure will become apparent from and be elucidated with reference to the embodiments described hereinafter.

BRIEF DESCRIPTION OF THE DRAWINGS

Exemplary embodiments of the disclosure will be described in the following with reference to the accompanying drawings.

DESCRIPTION OF EMBODIMENTS

Figure 1:
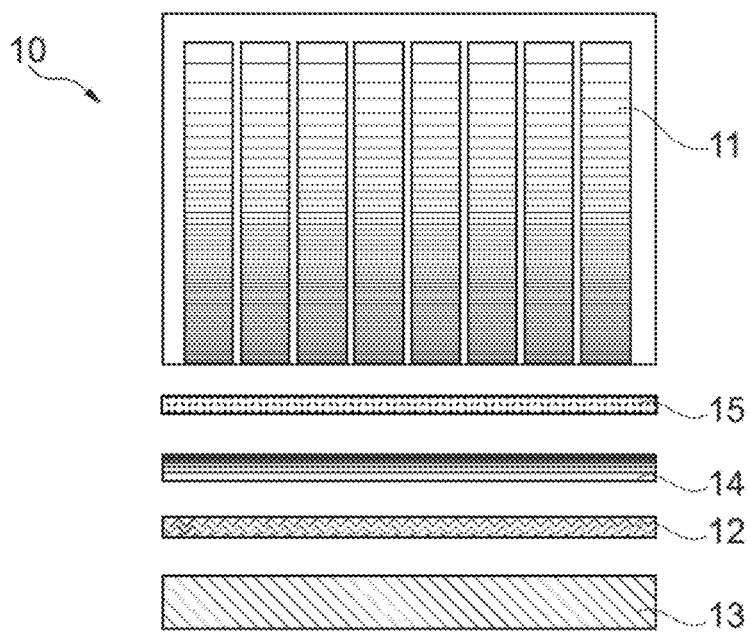
FIG. 1 shows schematically and exemplarily an embodiment of a temperature management system for an energy system of a motor vehicle according to the disclosure.
Figure 2:
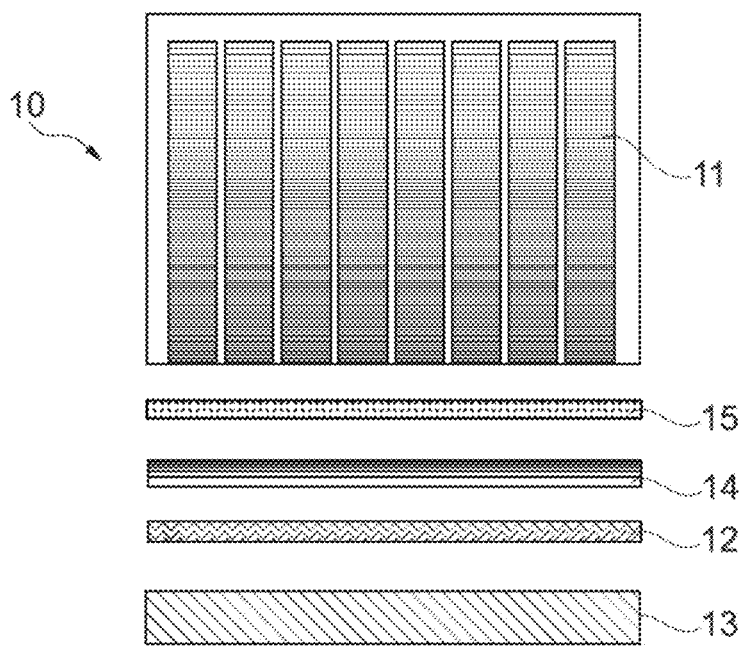
FIG. 2 shows schematically and exemplarily an embodiment of a temperature management system for an energy system of a motor vehicle according to the disclosure.
Figure 3:
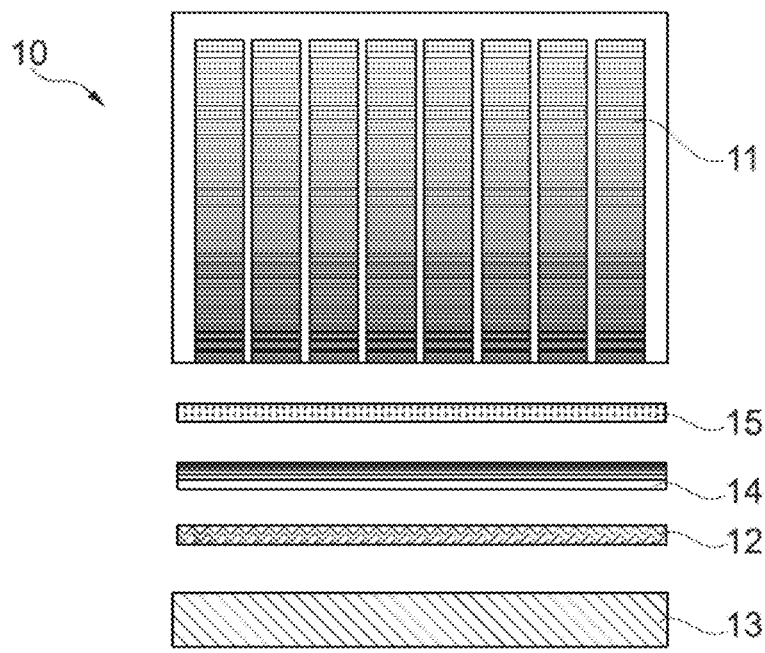
FIG. 3 shows schematically and exemplarily an embodiment of a temperature management system for an energy system of a motor vehicle according to the disclosure.

FIGS. 1 to 3 show schematically and exemplarily an embodiment of a temperature management system 10 for an energy system of a motor vehicle. The temperature management system 10 includes an energy storage system 11, a conductivity element 12, and an ambient interface 13.

The energy storage system 11 is here a battery that can be used for powering and driving the motor vehicle and/or as an auxiliary unit to provide energy for accessories.

The ambient interface 13 is here a battery tray to support or hold the energy storage system 11. The ambient interface 13 includes a first surface directed to an environment of the energy system and a second surface opposite to the first surface.

The conductivity element 12 is an element or layer arranged between the energy storage system 11 (battery) and the ambient interface 13 (battery tray). In particular, the conductivity element 12 is arranged between the second surface of the ambient interface 13 and the energy storage system 11.

The conductivity element 12 is switchable between an isolating mode and a conductive mode. The conductivity element 12 provides in the isolating mode a first thermal conductivity. The conductivity element 12 provides in the conductive mode a second thermal conductivity. The first thermal conductivity is lower than the second thermal conductivity. The conductivity element 12 is a two-states element, which can only have a first or a second thermal conductivity.

The conductivity element 12 includes a voltage sensitive material. The voltage sensitive material is switchable between the first and the second thermal conductivity depending on an applied voltage. The voltage sensitive material includes a piezoelectric material, for example a ceramic perovskite material as e.g. lead zirconate titanate.

The temperature management system 10 further includes a cooling system 14, which is a passive cooling plate arranged between the energy storage system 11 and the conductivity element 12. If necessary, the cooling system 14 cools the energy storage system 11 to avoid a temperature increase above an optimal operational temperature.

The temperature management system 10 further includes a thermal interface 15, which is an element or layer arranged between the energy storage system 11 and the cooling system 14.

The temperature management system 10 can be understood to protect the energy storage system 11 from temperature changes. The temperature changes can arise through different modes of the motor vehicle and/or different environment conditions. In other words, the temperature management system 10 may balance at least one of the following situations:

FIG. 1 shows a temperature management system 10 for an energy system of a motor vehicle in a driving mode. When driving the motor vehicle, the conductivity element 12 is used to reduce or eliminate an unwanted temperature increase of the energy storage system 11 by too much or too hot waste heat of the engine of the motor vehicle or other consuming units of the motor vehicle.

The conductivity element 12 is switched into the conductive mode with the second thermal conductivity to provide a heat transfer to and a heat exchange with the environment, which is usually cooler than the engine. As a result, a heating of the energy storage system 11 is reduced when the motor vehicle is driving.

FIG. 2 shows a temperature management system 10 for an energy system of a motor vehicle in a parking mode. When parking the motor vehicle, the conductivity element 12 is used to reduce or eliminate an unwanted temperature loss of the energy storage system 11 due to missing waste heat of the engine or other consuming units. The conductivity element 12 is switched into the isolating mode with the first thermal conductivity to reduce or eliminate a heat transfer to and a heat exchange with the environment, which is usually cooler than a good operational temperature of the energy storage system 11. A good operational temperature of the energy storage system 11 might be around 30 degree Celsius. As a result, the energy storage system 11 is kept warm relative to the ambient surrounding of about 20 degree Celsius while the motor vehicle is not driving.

FIG. 3 shows a temperature management system 10 for an energy system of a motor vehicle in a cold environment. A "cold environment" can be understood as below 0 degree Celsius, below minus 10 degree Celsius and less, or below minus 15 degree Celsius and less. In cold environments, the conductivity element 12 is used to reduce or eliminate an unwanted temperature loss of the energy storage system 11 due to the cold environment and the therefore cold ambient interface 13 (battery tray). The conductivity element 12 is switched into the isolating mode with the first thermal conductivity to reduce or eliminate a heat transfer to and a heat exchange with the environment, which is now definitely cooler than an operational temperature of the energy storage system 11. As a result, the energy storage system 11 is isolated from the ambient interface 13 to avoid a thermal bridge to the surrounding environment. The energy storage system 11 is kept warm relative to the cold surrounding environment.

Not shown, but available is a control unit that detects when the motor vehicle is in the parking mode or the driving mode. The control unit further receives outside and/or inside temperature data of the environment. The control unit can further switch the conductivity element 12 correspondingly into the isolating mode or the conductive mode.

Figure 4:
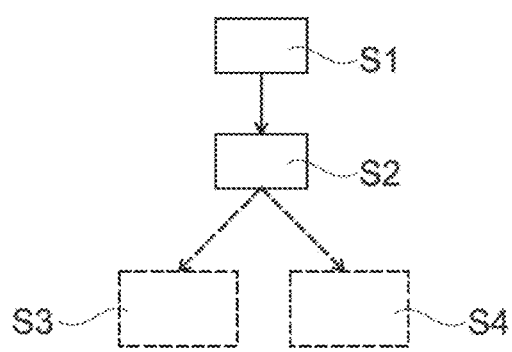
FIG. 4 shows schematically and exemplarily an embodiment of a temperature management method for an energy system of a motor vehicle according to the disclosure.

FIG. 4 shows a temperature management method for an energy system of a motor vehicle. The temperature management method includes the following steps:

- S1. Providing a temperature management system 10 for an energy system of a motor vehicle, wherein the temperature management system 10 includes an energy storage system 11, a conductivity element 12, and an ambient interface 13. The ambient interface 13 includes a first surface directed to an environment of the energy system and a second surface opposite to the first surface. The conductivity element 12 is arranged between the second surface of the ambient interface 13 and the energy storage system 11.
- S2. Applying a voltage to the conductivity element 12. The conductivity element 12 includes a voltage sensitive material. The voltage sensitive material includes a piezoelectric material, so that the conductivity element 12 switches between an isolating mode and a conductive mode. The conductivity element 12 provides in the isolating mode a first thermal conductivity and in the conductive mode a second thermal conductivity, wherein the first thermal conductivity is lower than the second thermal conductivity.

The temperature management method further includes the optional steps of

- S3. Detecting if the motor vehicle is in a parking mode, and if yes, applying the voltage to switch the conductivity element 12 in the isolating mode. In the isolating mode, the conductivity element 12 keeps the energy storage system 11 warm relative to the ambient surrounding while the motor vehicle is parking.
- S4. Detecting if the motor vehicle is in a driving mode, and if yes, applying the voltage to switch the conductivity element 12 in the conductive mode. In the conductive mode, the conductivity element 12 reduces a heating of the energy storage system 11 when the motor vehicle is driving.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and foregoing description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A temperature management system of a motor vehicle, comprising:
    an energy storage system,
    a conductivity element, and
    an ambient interface,
    wherein the ambient interface comprises a first surface directed to an environment of the energy system and a second surface opposite to the first surface,
    wherein the conductivity element is arranged between the second surface of the ambient interface and the energy storage system,
    wherein the conductivity element is switchable between an isolating mode and a conductive mode, wherein the conductivity element provides in the isolating mode a first thermal conductivity, wherein the conductivity element provides in the conductive mode a second thermal conductivity, and wherein the first thermal conductivity is lower than the second thermal conductivity, and
    wherein the conductivity element comprises a voltage sensitive material, which is switchable between the first and the second thermal conductivity depending on an applied voltage, and wherein the voltage sensitive material comprises a piezoelectric material.

2. The temperature management system according to claim 1, wherein the conductivity element is switchable to the isolating mode when the motor vehicle is in a parking mode to keep the energy storage system warm.

3. The temperature management system according to claim 1, wherein the conductivity element is switchable to the conductive mode when the motor vehicle is in a driving mode to reduce a heating of the energy storage system.

4. The temperature management system according to claim 1, further comprising a control unit configured to detect when the motor vehicle is in a parking mode or a driving mode and to switch the conductivity element correspondingly into the isolating mode or the conductive mode.

5. The temperature management system according to claim 1, further comprising a temperature unit configured to detect an outside temperature outside the motor vehicle and to switch the conductivity element based on the outside temperature into the isolating mode or the conductive mode.

6. The temperature management system according to claim 1, wherein the piezoelectric material is a ceramic perovskite material.

7. The temperature management system according to claim 1, wherein the piezoelectric material is lead zirconate titanate.

8. The temperature management system according to claim 1, wherein the conductivity element is a two-states element, which has only either the first or the second thermal conductivity.

9. The temperature management system according to claim 1, further comprising a cooling system, which is arranged between the energy storage system and the conductivity element.

10. The temperature management system according to claim 9, wherein the cooling system is a passive cooling system.

11. The temperature management system according to claim 9, further comprising a thermal interface, which is arranged between the energy storage system and the cooling system.

12. A temperature management method for an energy system of a motor vehicle, comprising the following steps:
    providing a temperature management system for an energy system of a motor vehicle, wherein the temperature management system comprises an energy storage system, a conductivity element, and an ambient interface,
    wherein the ambient interface comprises a first surface directed to an environment of the energy system and a second surface opposite to the first surface, and wherein the conductivity element is arranged between the second surface of the ambient interface and the energy storage system, and
    applying a voltage to the conductivity element, wherein the conductivity element comprises a voltage sensitive material, and wherein the voltage sensitive material comprises a piezoelectric material, so that the conductivity element switches between an isolating mode and a conductive mode,
    wherein the conductivity element provides in the isolating mode a first thermal conductivity and in the conductive mode a second thermal conductivity, and wherein the first thermal conductivity is lower than the second thermal conductivity.

13. The temperature management method according to claim 12, further comprising the step of detecting if the motor vehicle is in a parking mode, and if yes, applying the voltage to switch the conductivity element in the isolating mode to keep the energy storage system warm.

14. The temperature management method according to claim 12, further comprising the step of detecting if the motor vehicle is in a driving mode, and if yes, applying the voltage to switch the conductivity element in the conductive mode to reduce a heating of the energy storage system.

15. A motor vehicle, comprising:
a temperature management system, comprising:
   an energy storage system,
   a conductivity element, and
   an ambient interface,
   wherein the ambient interface comprises a first surface directed to an environment of the energy system and a second surface opposite to the first surface,
   wherein the conductivity element is arranged between the second surface of the ambient interface and the energy storage system,
   wherein the conductivity element is switchable between an isolating mode and a conductive mode, wherein the conductivity element provides in the isolating mode a first thermal conductivity, wherein the conductivity element provides in the conductive mode a second thermal conductivity, and wherein the first thermal conductivity is lower than the second thermal conductivity, and
   wherein the conductivity element comprises a voltage sensitive material, which is switchable between the first and the second thermal conductivity depending on an applied voltage, and wherein the voltage sensitive material comprises a piezoelectric material.

16. The motor vehicle according to claim 15, wherein the conductivity element is switchable to the isolating mode when the motor vehicle is in a parking mode to keep the energy storage system warm.

17. The motor vehicle according to claim 15, wherein the conductivity element is switchable to the conductive mode when the motor vehicle is in a driving mode to reduce a heating of the energy storage system.

18. The motor vehicle according to claim 15, further comprising a control unit configured to detect when the motor vehicle is in a parking mode or a driving mode and to switch the conductivity element correspondingly into the isolating mode or the conductive mode.

19. The motor vehicle according to claim 15, further comprising a temperature unit configured to detect an outside temperature outside the motor vehicle and to switch the conductivity element based on the outside temperature into the isolating mode or the conductive mode.

20. The motor vehicle according to claim 15, wherein the piezoelectric material is one of a ceramic perovskite material and lead zirconate titanate.

* * * * *